United States Patent [19]

Bakken

[11] 4,118,274

[45] Oct. 3, 1978

[54] SYSTEM FOR THE PRODUCTION OF PLASMA

[75] Inventor: George S. Bakken, Ann Arbor, Mich.

[73] Assignee: The United States of America as represented by the United States Department of Energy, Washington, D.C.

[21] Appl. No.: 581,608

[22] Filed: May 29, 1975

[51] Int. Cl.$^2$ .................................................. G21B 1/00
[52] U.S. Cl. .......................................................... 176/1
[58] Field of Search ........................ 176/1, 2; 350/294

[56] References Cited

U.S. PATENT DOCUMENTS

| | | | |
|---|---|---|---|
| 3,378,446 | 4/1968 | Whittlesey | 176/1 |
| 3,652,393 | 3/1972 | Kaiser et al. | 176/1 |
| 3,826,561 | 7/1974 | Gregg | 176/1 |

OTHER PUBLICATIONS

Beam Foil-Spectroscopy, S. Bashkin, Gordon & Breach, New York (1968), pp. 146-149.
Applied Optics, vol. 13, No. 6, (5/25-27/74) Bakken pp. 1291-1292.

Primary Examiner—Samuel W. Engle
Assistant Examiner—S. A. Cangialosi
Attorney, Agent, or Firm—Dean E. Carlson; Frank H. Jackson; Robert J. Fisher

[57] ABSTRACT

The present invention provides a system for the production of a plasma by concentrating and focusing a laser beam on the plasma-forming material with a lightfocusing member which comprises a parabolic axicon in conjunction with a coaxial conical mirror. The apex of the conical mirror faces away from the focus of the parabolic axicon such that the conical mirror serves to produce a virtual line source along the axis of the cone. Consequently, irradiation from a laser parallel to the axis toward the apex of the conical mirror will be concentrated at the focus of the parabolic axicon, impinging upon the plasma-forming material there introduced to produce a plasma. The system is adaptable to irradiation of a target pellet introduced at the focus of the parabolic axicon and offers an advantage in that the target pellet can be irradiated with a high degree of radial and spherical symmetry.

11 Claims, 6 Drawing Figures

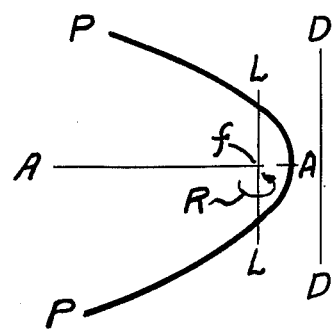
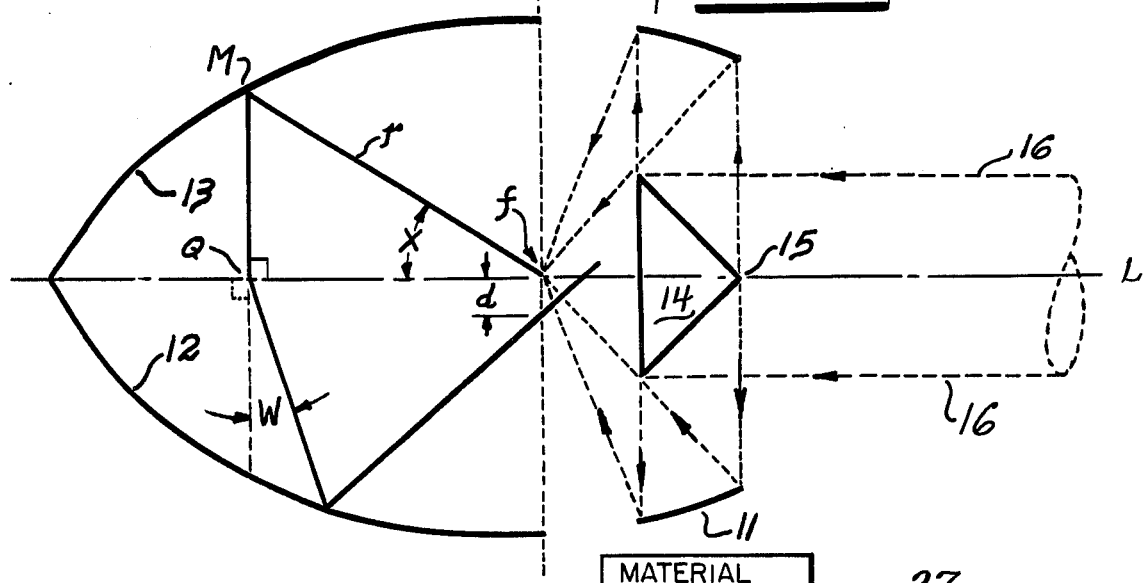
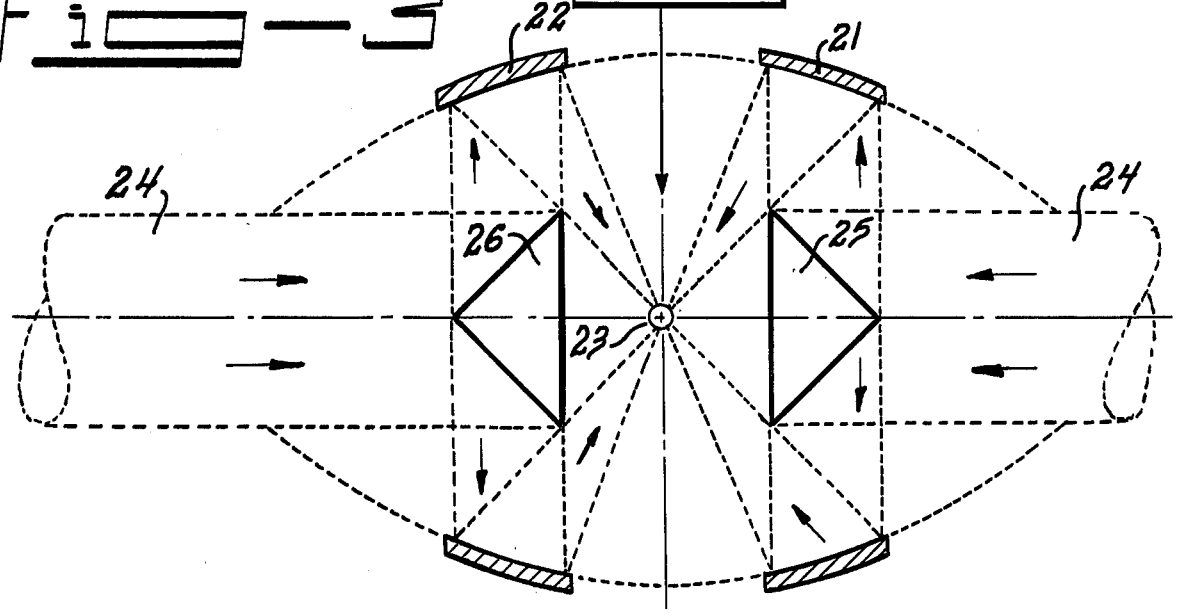

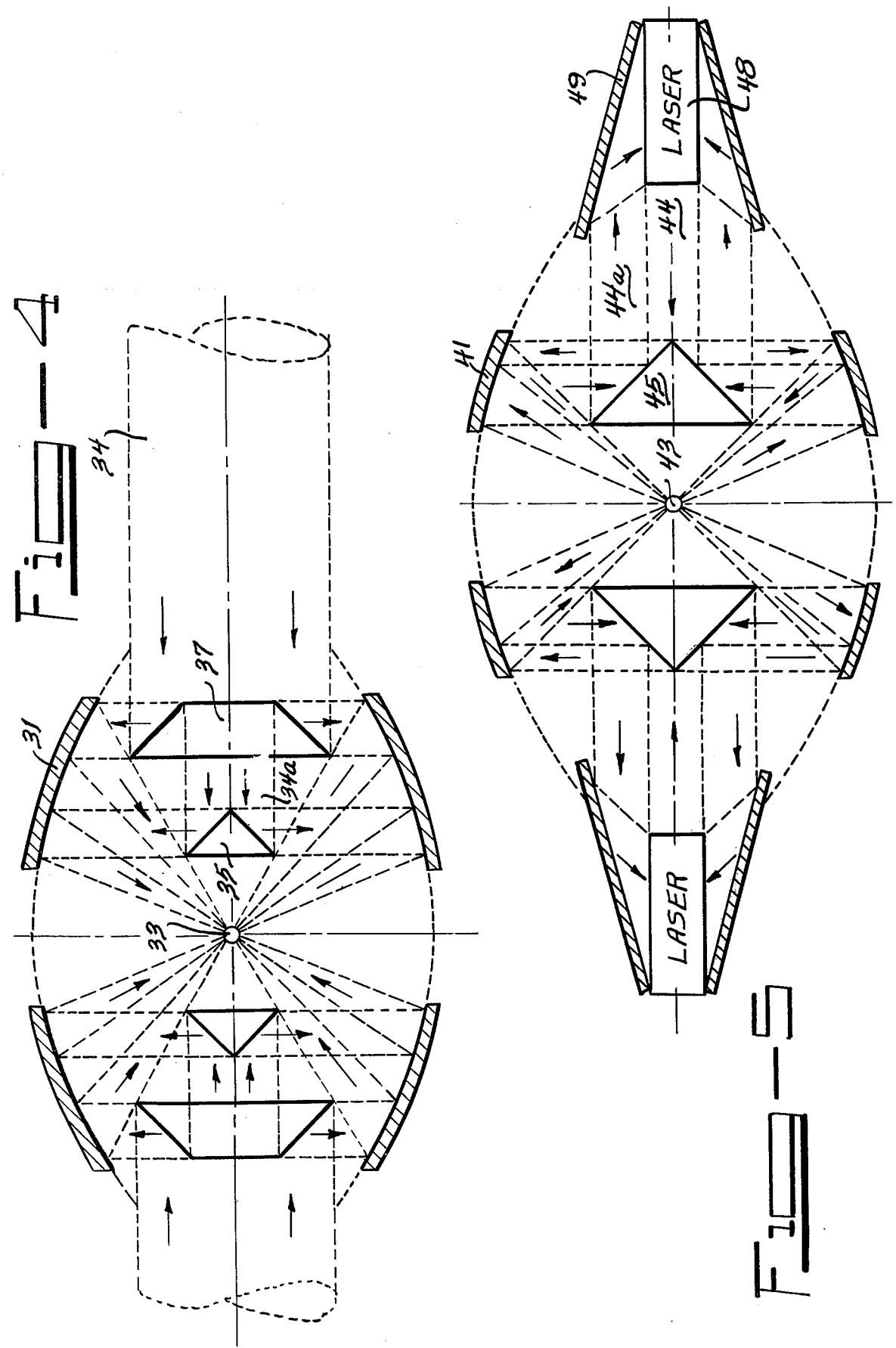

SYSTEM FOR THE PRODUCTION OF PLASMA

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates generally to a system for the production of a plasma. More particularly, the invention is directed towards a system for focusing and concentrating a laser beam onto a plasma-forming material in order to produce a plasma. The system is useful in the production of a plasma by laser radiation onto a target pellet of plasma-forming material.

Of the many proposed solutions to the continually growing need for energy, controlled thermonuclear reactors are a potential and perhaps one of the more prominent proposed solutions to the long-term energy problem. One area of interest in controlled thermonuclear reactor research is the investigation of the potential for laser-fusion. In this technique, thermonuclear fusion would be induced in a small pellet of deuterium and/or tritium containing material by irradiating it with an intense, coherent and, preferably, spherically and radially symmetric pulse of light from a laser. While the general theoretical process of inducing fusion by means of a laser is well-known and described in the prior art, briefly stated, the energy of a sufficiently intense pulse of laser light focused onto the surface of the target pellet is absorbed by the surface of the pellet, causing the surface to vaporize and expand away from the center of the pellet at high velocity. The reaction force from this expansion compresses the remainder of the pellet to high density, and the combined effect of the irradiation and compression heats the resultant plasma to a high temperature. When the combination of time, temperature and density of the compressed plasma is sufficiently large, the so induced fusion reaction of the deuterium and/or tritium will generate more energy than was required to compress the pellet and induce the fusion, permitting the generation of power.

While the feasibility of laser-fusion has yet to be conclusively demonstrated, considerable interest is being directed to this technique. Necessary research in this area involves the study of plasmas as well as the study of the compression of target pellets by an incident laser beam and the plasmas so produced. The particular aspect of this technique with which the present invention is concerned is a method and system which provides especially effective focusing of the laser beam onto a target pellet to produce a plasma.

It is an object of the present invention to provide a system for the production of a plasma.

It is another object of the present invention to provide a system in which a laser supplies an incident beam which is focused onto a plasma-forming material so as to produce a plasma.

An additional object of the present invention is to provide a system for the production of a plasma by irradiating a target pellet of a plasma-forming material by focusing a beam emitted by a laser onto the target material.

A further object of the present invention is to focus the incident laser beam in such a way that such a pellet plasma-forming material is irradiated with a high degree of radial and spherical symmetry.

SUMMARY OF THE INVENTION

The present invention provides a system for the production of a plasma from a plasma-forming material. The system includes a light-focusing member which comprises a parabolic axicon in conjunction with a coaxial conical mirror, the conical mirror serving to produce a virtual line source along the axis of the cone. Means are provided for introducing the plasma-forming material at the focus of the light-focusing member or the parabolic axicon. A laser is disposed so as to irradiate the light-focusing member along the axis toward the apex of the conical mirror such that the laser irradiation is concentrated at the focus of the parabolic axicon, impinging upon the plasma-forming material so as to produce a plasma.

DESCRIPTION OF THE DRAWINGS

Objects and advantages, as well as a more complete understanding of the aspects of the present invention, will be obtained from the following detailed description and with reference to the drawings, in which:

FIG. 1 is a graphic representation illustrating the method by which a parabolic axicon is generated.

FIG. 2 is a cross-sectional view of a parabolic axicon taken on a plane through the axis of rotation.

FIG. 3 is a cross-sectional view of a focusing member in accordance with the present invention.

FIG. 4 is a cross-sectional view of an alternative embodiment of the focusing member of the present invention.

FIG. 5 is a cross-sectional view of another alternative embodiment of the present invention which provides for recovery of some of the energy emitted as radiation by the plasma.

DESCRIPTION OF THE INVENTION

Figure 6:
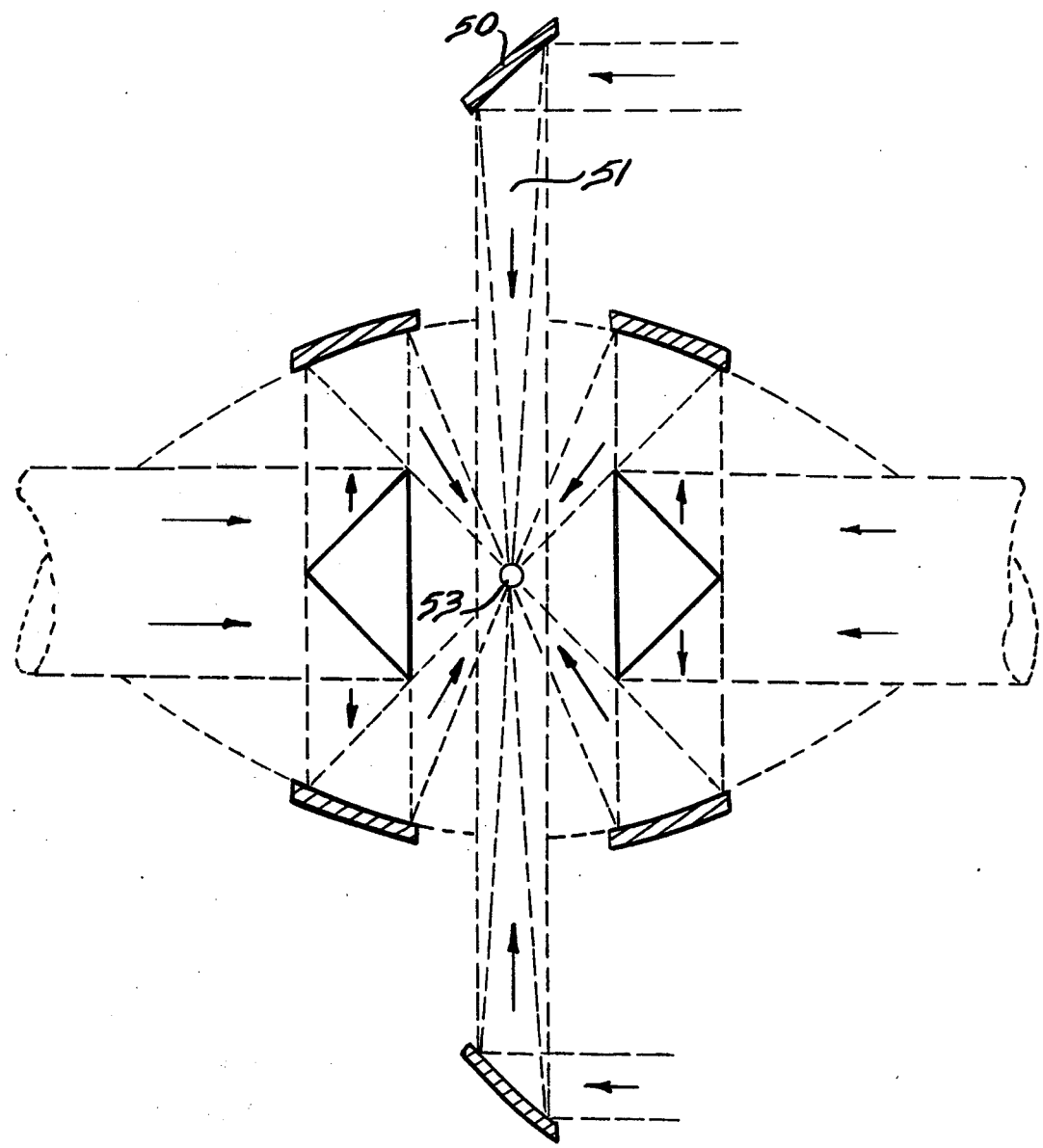
FIG. 6 is a cross-sectional view of an alternative embodiment of the present invention which provides for additional radial irradiation of the target material.

In accordance with the present invention, a system is provided for the production of a plasma.

The present invention employs a parabolic axicon, which is defined and described in detail hereinbelow, as one component in the system. The properties and characteristics of the parabolic axicon which are likewise discussed in more detail below, have been advantageously employed to concentrate and focus a beam of light onto a plasma-forming material.

Axicons in general are optical elements which have been known in the prior art. A definition of an axicon was given by J. H. McLeod in J. Opt. Soc. Amer., Vol. 44, No. 8, page 592. A more formal definition of an axicon which has become accepted by those in the art was that definition put forth by J. H. McLeod in his paper published in the Journal of the Optical Society of America, Vol. 50, No. 2, page 166, February 1960, where an axicon was defined as "Any figure of revolution that by reflection, or refraction, or both will bend light from a point source on the axis of the figure of revolution so as to cross the axis not at a point, as would be the case with a lens, but along a continuous line of points along a substantial extent of the axis." As will be seen from the description and discussion below, the parabolic axicon employed in the system of the present invention is a special figure of revolution which satisfies this general definition of an axicon.

While satisfying this general definition, the parabolic axicon incorporated in the present system is a more specifically defined element which has properties and characteristics rendering the element particularly adaptable for use in a system for the production of a plasma. Some of these properties and characteristics are somewhat related to common parabolic mirrors or reflective surfaces generated as a paraboloid of revolution. These parabolic mirrors or paraboloids of revolution should be understood to be those paraboloidal reflective surfaces generated by the revolution of the parabola about its axis. Such optical elements have been employed previously for focusing of light. The important common property is a theoretically ideal point focus of a parallel light beam. These elements then have the advantage that a plane wave is focused onto a point without aberrations under ideal conditions.

L. W. Casperson and M. S. Shekhani in their article in Applied Optics, Vol. 13, No. 1, page 104, January 1974, discuss the use of a "radial mode focusing element" to condense and focus an incident laser beam to the focal spot in order to produce a plasma. While somewhat ambiguous and not entirely consistent with their drawings, their description of their radial mode focusing element is a type of a parabolic mirror consisting of small segments of a paraboloidal mirror, a mirror obtained by rotating a parabolic reflecting surface about its axis, the radial mode focusing element being small segments of the reflecting surface which are essentially radial to the axis at the focus of the mirror. In accordance with their focusing element, a target pellet material introduced at the focus is radially irradiated such that a standing wave condition for amplitude addition is possible. The use of only segments of the paraboloidal mirror allows access to the focus in order to permit ease of introduction of the target material.

The parabolic axicon is quite distinguishable from the radial mode focusing element in that the parabolic axicon is not a paraboloidal mirror as that term is generally understood. That is, the parabolic axicon is not generated by rotating a parabola about its axis. In addition, the parabolic axicon has unique features and characteristics which are highly advantageous, as will be discussed below.

The parabolic axicon itself, as an optical element, has been previously known in the general optics art. The parabolic axicon was previously described by the present inventor in his Masters thesis at Rice University, 1967-unpublished and a summary of the work by J. A. Jordan in Beam-Foil Spectroscopy (Gordon and Breach, New York, 1968) and in his PhD thesis at Rice University in 1970, Dissertation Abstract No. B 31, 3665 (1970). The parabolic axicon structure was described and discussed in connection with beam foil spectroscopy experiments. A dark-field incident-light illuminator for microscopy employing an optical element similar to the parabolic axicon was also known in the prior art. However, in accordance with the present invention, because of its unique characteristics and properties, the parabolic axicon has been incorporated into a system for the production of a plasma.

The system of the present invention employs as one component thereof a light-focusing member comprising a parabolic axicon in conjunction with a coaxial conical mirror. The term "parabolic axicon" as used herein is defined as the surface of revolution obtained by rotating a parabola about its latus rectum. Referring to FIG. 1, there is shown the parabolic curve P—P which is a parabola having a focus at point $f$, directrix D—D and axis A—A passing through the focus. The latus rectum of the parabola P—P, represented by line L—L, passes through the focus $f$ parallel to the directrix D—D. The parabolic axicon is defined herein as the resulting optical surface of revolution, generally football-shaped, generated by rotating the parabola about its latus rectum, the rotation being indicated by arrow labeled R. Since each section of this optical surface will have the same optical properties, it should be understood that the term "parabolic axicon" as used herein is also meant to define sections of such an optical surface. For example, in the right-hand portion of FIG. 2, the parabolic axicon illustrated at 11 is a section of the complete surface of revolution. Use of a section of the parabolic axicon permits means for the introduction of light incident upon the inner reflective surfaces, as well as permitting ease of access to the focus.

It should be apparent that the parabolic axicon will have reflective characteristics somewhat related to the common parabolic mirrors obtained by rotating the parabola about its axis. Notably, the focus is a geometrical point without aberrations under ideal conditions. However, rotation about the latus rectum gives somewhat different and advantageous optical properties. These optical properties are explained in conjunction with FIG. 2. Referring to this figure, there is shown a cross section of the parabolic axicon taken on a plane through the latus rectum L—L. The parabolic axicon has the property that light emitted perpendicular to the latus rectum will strike the reflective surface of the parabolic axicon and be reflected back through its focus. Referring to the left-hand portion of FIG. 2, the parabolic axicon is seen to be the two parabolic curves 12 and 13. Light emitted perpendicularly from any point Q on the latus rectum L—L is reflected from point M on the parabolic axicon surface 13 through the focus $f$. If the distance from the focus $f$ to the point M on reflective surface 13 is $r$ and the angle between the latus rectum and the reflected ray is X, then light emitted from point Q deviating a small angle W from the perpendicular will be reflected so as to fall on a circle of radius $d = rW \sec X$ centered on $f$.

Referring to the right-hand portion of FIG. 2, it can be seen how these properties of the parabolic axicon have been put to highly advantageous use. The parabolic axicon indicated at 11 (which is a segment of a parabolic axicon surface indicated by the dotted lines) is shown in combination with a coaxial conical mirror 14. The apex 15 of the conical mirror 14 faces away from the focus $f$ of the parabolic axicon, the conical mirror 14 serving to reflect incident light toward the parabolic axicon. Preferably, conical mirror 14 is a reflecting 45° half-angle cone. Incident light rays impinging on such a conical mirror in a direction parallel to the latus rectum L—L, the axis of the cone, will be reflected perpendicular thereto such that the conical mirror serves as a virtual line source along the axis of the cone. Consequently, the light rays 16 will be reflected from the 45° half-angle cone to the parabolic axicon 11 perpendicular from the latus rectum and, as discussed previously, from the parabolic axicon 11 to the focus. Therefore, this light-focusing member consisting of the parabolic axicon and the coaxial conical mirror serves to concentrate and focus incident light at a point at the focus. While a 45° half-angle cone is preferred, it should be understood that small deviations from 45° are also operable, as would be apparent from the discussion above regarding light emitted from the point Q at a small angle W from the perpendicular. In such a case, the incident light will be concentrated in a small circular area centered on the focus $f$. For a non-45° mirror in the center, incident light is focused sharply, but not ideally so, at a point slightly displaced from $f$ approximately by a distance $rW \csc X$.

In the system of the present invention for the production of a plasma, means are provided for introducing a plasma-forming material at the focus of the light-focusing member. Laser means are disposed so as to irradiate the light-focusing member along its axis toward the apex of the conical mirror such that the laser irradiation is concentrated at the focus and impinges upon the plasma-forming material so as to produce a plasma.

The formation of a plasma by irradiation with concentrated laser beam is a technique which is well known in the art. In accordance with the present invention, the laser means employed for directing an incident laser beam onto the focusing member can be any of the well-known laser means available in the art. Similarly, the plasma-forming material can be introduced at the focus of the light-focusing member in accordance with techniques which are known in the art. For example, the plasma-forming material can be introduced at the focus in the form of a gas or the plasma-forming material can be introduced at the focus as a target pellet. Methods for introducing a target pellet at a point in order to permit laser radiation are also known in the art, there being considerable interest in these methods in relation to laser-fusion. The present system is adapted to produce plasmas, plasmas generated from hydrogen, deuterium, and tritium being of particular interest, and is therefore useful in the study of plasmas and plasma physics. Should laser fusion be shown to be feasible, the present system could readily be adapted for use therein.

The advantages of the parabolic axicon light-focusing member of the present system for the production of a plasma can be appreciated from a consideration of various possible embodiments. Referring to FIG. 3, there is shown a preferred embodiment of the system in accordance with the present invention. The parabolic axicon 21 and the parabolic axicon 22 are employed in combination such that their foci coincide. In the particular embodiment illustrated in FIG. 3, both parabolic axicons 21 and 22 could be considered to be segments of the parabolic axicon indicated by the dotted lines. However, we have defined parabolic axicon so as to include segments of a parabolic axicon surface and therefore, parabolic axicons 21 and 22 will be considered as independent. Since it is desirable to irradiate the plasma-forming material 23 as symmetrically as possible, the light-focusing members are symmetrically disposed, in the present case this being accomplished by making the members coaxial. The target pellet of plasma-forming material 23, introduced at the coincident foci by means known in the art and indicated generally at 27 in FIG. 3, is irradiated by incident laser radiation indicated as a flux 24 along the common latus rectum of the parabolic axicons 21 and 22 and consequently along the axes of the conical mirrors 25 and 26. The light is reflected from the conical mirrors 25 and 26 to the respective parabolic axicons 21 and 22 and therefrom onto the plasma-forming material 23 introduced at the focus.

Variations in the geometry of irradiation of a target pellet are possible. The precise zones of the target material irradiated may be varied by adjusting the diameter and position of the central conical mirror and/or employing different segments of the parabolic axicon. A more complete description of possible variations is contained in the applicant's article entitled "The Parabolic Axicon", published in Applied Optics, Vol. 13, page 1291, June 1974, which article is incorporated herein by reference.

An alternative embodiment is illustrated in FIG. 4. This embodiment employs additional coaxial conical mirrors, a second such mirror 37 being illustrated in the figure. In accordance with this embodiment, multiple zones of a target material 33 will be irradiated. The second conically shaped mirror 37 is coaxial with the first conical mirror 35 and is positioned exterior to the first mirror with respect to the focus of the parabolic axicon 31. In order to irradiate both mirrors, the second conically shaped mirror has a transparent portion along the axis of such a diameter as to permit the laser radiation 34 along the axis to pass through the second mirror 37 so as to be incident upon the first conical mirror 35. This transparent section can be either in the form of a nonreflective transparent flat portion which will permit radiation to pass therethrough to the first conical mirror or in the form of a bore through which the radiation will pass.

Still another alternative embodiment is illustrated in FIG. 5. In accordance with this embodiment, a parabolic axicon focusing system is modified so as to return a portion of the light emitted by the plasma in order to pump the exciting laser. Reflective means are associated with the laser and disposed such that irradiation emitted from the focus by the plasma will be reflected back by the parabolic axicon and the conical mirror so as to pump the laser and provide potential means for the conservation of some of the energy. As illustrated in FIG. 5, the incident irradiation in the form of flux 44 emitted by the laser 48 strikes conical mirror 45 and is reflected to the parabolic axicon 41 from which it is directed onto the plasma-forming material 43, generating a plasma therefrom. Any energy emitted from the so-formed plasma as light energy and emitted in a direction so as to strike the parabolic axicon 41 will, because of the optical features of the focusing system, be reflected perpendicular to the latus rectum, thereby striking conical mirror 45 which will reflect the radiation in a direction parallel to the axis of the cone as flux 44a. This flux is reflected by reflecting means 49 which directs the incident flux to the laser means 48. Such a system could be used in order to recover some of the energy used in the generation of the plasma in such a manner as to provide optical pumping for the laser means.

Another variation illustrated in FIG. 6 takes advantage of the ease of access to the focus of the focusing member in the present system. The perimeter of the parabolic axicon focusing system can be surrounded with an additional focusing means 50 at a position radial to the axis at the focus so as to focus a beam 51 from a laser means through radial apertures in the focusing system onto the perimeter of a target pellet 53 at the focus of the parabolic axicon focusing system, thereby improving the irradiation geometry as well as increasing the total area of the target pellet which is irradiated. Another modification or embodiment would be to perforate the central conical mirror along the axis thereof and fit it with a lens or a deep parabaloidal reflecting surface so as to irradiate the pellet along the axis of the mirror.

The present invention for the production of a plasma offers several advantages because of its optical characteristics. The parabolic axicon focusing system focuses an incident plane wave from a laser or lasers arranged to irradiate the opposite ends of the optical system in a radially and spherically symmetric converging spherical wave. If the two lasers or two laser beams from the same laser are properly adjusted and phase locked, it would be possible to produce the standing wave condition for the addition of amplitudes of the laser beams. In addition, by proper arrangement and construction of the segments of the parabolic axicon and conical mirror, it is possible to irradiate an extremely large fraction of the total area of a target pellet introduced at the focus. One possible embodiment permits irradiation of 62.1% of the surface of a sphere (i.e. a solid angle of 3.90 steradians as seen from the focal point of the system).

The present system and the method for production of a plasma employing the present system offers many advantages over previous apparatus and methods. Since the optical elements are a pure reflecting system, they have the advantage in that they can be constructed with a high thermal conductivity metal. The elements may also have embedded coolant channels, permitting a high rate of removal of the heat absorbed by the optical elements, thereby permitting higher power densities in the laser beams employed. This advantage is not available with respect to methods and apparatus employing refracting optical elements. In addition, should the system be adapted for use in laser fusion, the above advantage facilitates the removal of heat energy which would be absorbed by the surfaces from the fusion reaction. The use of high power densities in the inducing laser beam and the high rate of repetition necessary for commercial laser fusion systems would be facilitated by the use of an all reflecting system like the parabolic axicon focusing system.

The present invention also has the advantage over conventional polyhedral laser radiation geometries of simplicity due to the small number of optical elements required. This also reduces the amount of laser energy absorbed by the optical system. The present parabolic axicon focusing system offers the advantage of radial and spherical symmetry and the possibility of establishing a standing wave condition such that the amplitudes rather than intensities of the laser beams are additive in the optical electromagnetic field irradiating of the pellet. The parabolic axicon focusing element also permits distribution of the irradiation over a large fractional area of the pellet and therefore provides better symmetry with smaller gaps between irradiated areas. This provides better compression and containment geometry in the irradiation of a target pellet. The parabolic axicon focusing system also provides convenient access via gaps in the optical surfaces around the circumference of the focusing system and in areas radial to the focus, thereby facilitating the introduction of a target pellet to be irradiated and facilitating measurements of a resulting plasma.

The embodiments of the invention in which an exclusive property or privilege is claimed are defined as follows:

1. A system for the production of a plasma comprising:
   (a) a light-focusing member comprising a parabolic axicon with a coaxial conical mirror, the apex of said conical mirror facing away from the focus of said parabolic axicon, said conical mirror being such as to produce a virtual line source along the axis of the cone;
   (b) means for introducing a plasma-forming material at the focus of said light-focusing member; and
   (c) laser means disposed so as to irradiate such light-focusing member along the axis toward the apex of said conical mirror such that the laser irradiation is concentrated at the focus of the parabolic axicon of the focusing member and impinges upon said plasma-forming material so as to produce a plasma.

2. The system for the production of plasma in accordance with claim 1 wherein there are a plurality of said light-focusing members and the foci of the parabolic axicons of the light-focusing members coincide.

3. The system of claim 2 wherein the light-focusing members are symmetrically disposed.

4. The system of claim 3 wherein there are an even number of focusing members, the members are symmetrically disposed in pairs, and the members of each pair are coaxial.

5. The system of claim 1 further comprising a second conically shaped mirror coaxial with the first conical mirror and positioned exterior to the first mirror with respect to the focus of the parabolic axicon, said second conically shaped mirror having a transparent portion along the axis thereof to permit radiation to pass therethrough to the inner first conical mirror.

6. The system of claim 1 wherein apertures are provided in the parabolic axicon at positions radial to the axis at the focus and said system further comprises mirrors positioned so as to reflect a laser beam through said apertures to said focus.

7. A method of producing a plasma comprising:
   (a) introducing a plasma-forming material into a space;
   (b) triggering a laser to emit a beam of radiation;
   (c) directing and concentrating the radiation onto said plasma-forming material with an optical system comprising a parabolic axicon in combination with a coaxial conical mirror, whereby said laser radiation produces a plasma from said plasma-forming material.

8. The method of claim 7 wherein said plasma-forming material is in the form of a target pellet and wherein said pellet is introduced at the focus of said parabolic axicon.

9. An apparatus for focusing a laser beam onto a target pellet comprising:
   a laser;
   means for focusing a laser beam, said means comprising a parabolic axicon and a coaxial conical mirror, the apex of said conical mirror facing away from the focus of said parabolic axicon;
   means for directing a beam from said laser onto said conical mirror in a direction parallel to the axis of said conical mirror, whereby said beam is concentrated at the focus of said parabolic axicon; and
   means for introducing said target pellet at said focus.

10. The apparatus of claim 9 wherein said conical mirror is a reflecting 45° half-angle cone.

11. The apparatus of claim 9 wherein there are a plurality of said focusing means, each such focusing means concentrating a laser beam onto said target pellet.

* * * * *